(No Model.) 6 Sheets—Sheet 3.
D. H. CHURCH.
MACHINE FOR MAKING GEARS OR PINIONS.

No. 476,953. Patented June 14, 1892.

Attest:
Geo. T. Smallwood.
A. D. Harrison.

Inventor
D. H. Church
by Wight Brown Crosley
Attys.

(No Model.) 6 Sheets—Sheet 4.
D. H. CHURCH.
MACHINE FOR MAKING GEARS OR PINIONS.

No. 476,953. Patented June 14, 1892.

Attest:
Geo. T. Smallwood.
A. D. Harrison

Inventor:
D. H. Church
by Wight Brown Kensley
Attys.

(No Model.)  6 Sheets—Sheet 5.
D. H. CHURCH.
MACHINE FOR MAKING GEARS OR PINIONS.
No. 476,953.  Patented June 14, 1892.
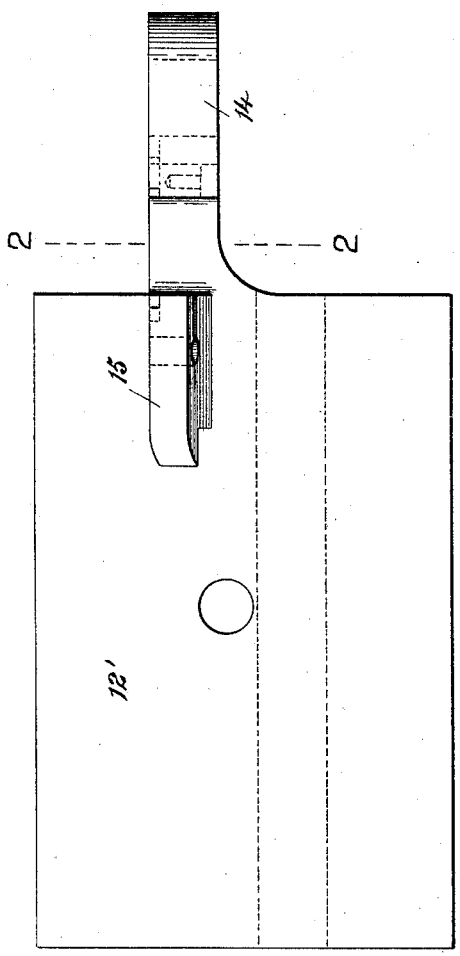
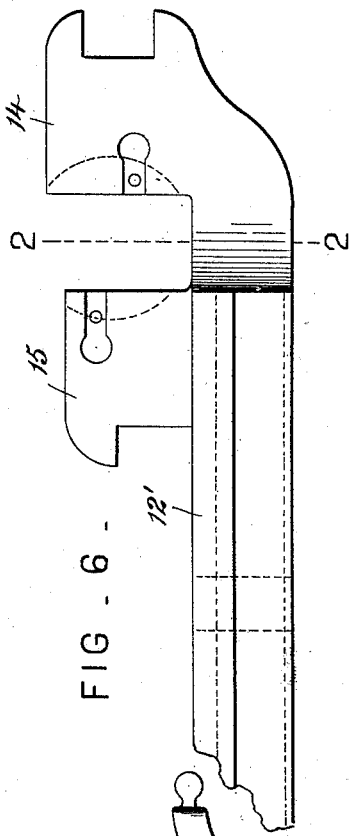
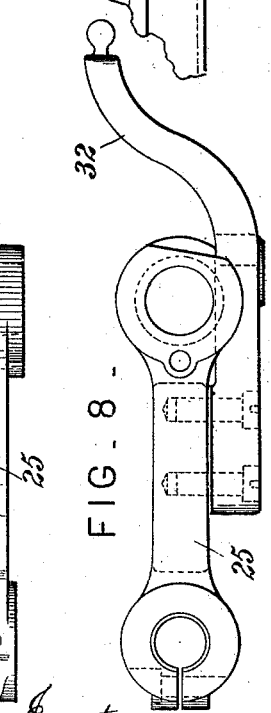
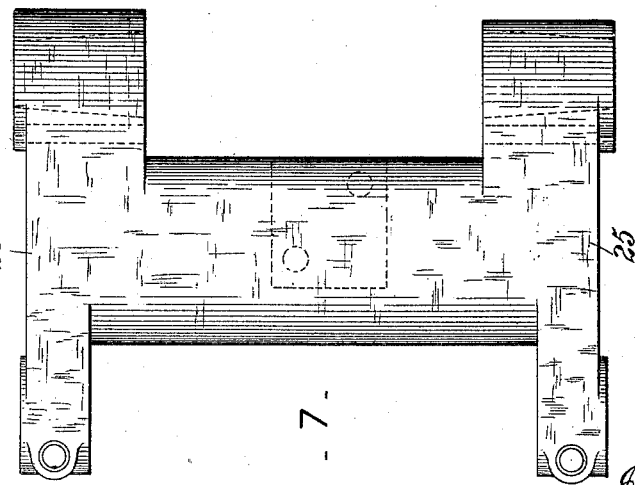

(No Model.) 6 Sheets—Sheet 6.
D. H. CHURCH.
MACHINE FOR MAKING GEARS OR PINIONS.
No. 476,953. Patented June 14, 1892.
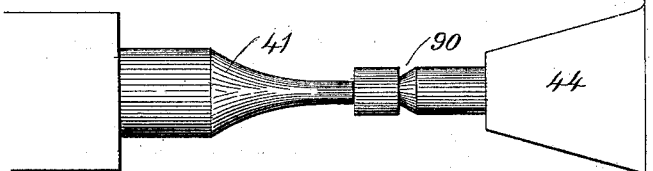
FIG. 9.
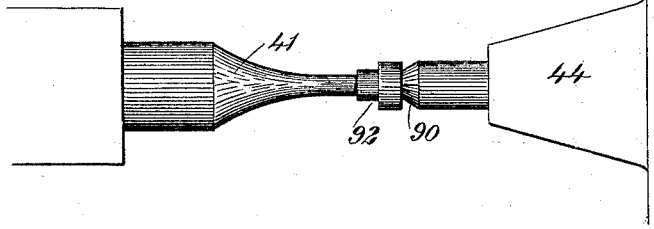
FIG. 10.
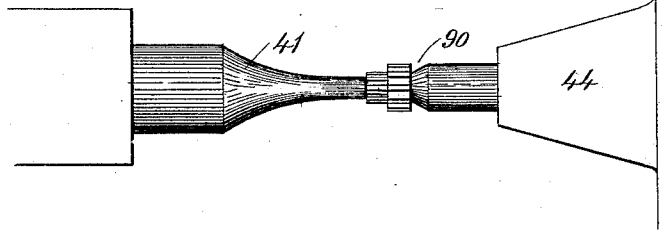
FIG. 11.
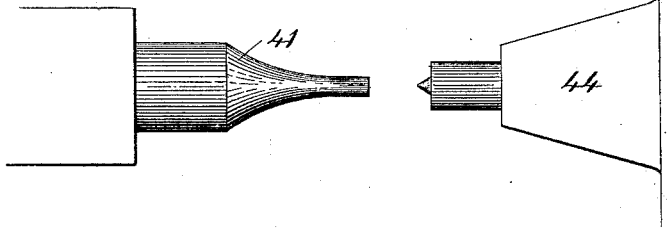
FIG. 12.
FIG. 13.
Attest:
Geo. T. Smallwood.
A. D. Harrison.
Inventor:
D. H. Church
by Knight Brothers Townley
Attys.

UNITED STATES PATENT OFFICE.

DUANE H. CHURCH, OF WALTHAM, MASSACHUSETTS.

MACHINE FOR MAKING GEARS OR PINIONS.

SPECIFICATION forming part of Letters Patent No. 476,953, dated June 14, 1892.

Application filed March 1, 1892. Serial No. 423,413. (No model.)

*To all whom it may concern:*

Be it known that I, DUANE H. CHURCH, of Waltham, in the county of Middlesex and State of Massachusetts, have invented certain new and useful Improvements in Machines for Making Gears or Pinions, of which the following is a specification.

The object of this invention is the production of a machine for manufacturing gears or pinions, more particularly small ones, such as the "minute-pinions" used in the mechanism of watches.

The invention relates to the arrangement of a mechanically-operated series of cutting-tools, causing them to operate relatively to each other to make the proper action at the proper time.

The invention consists in certain features of novelty more particularly pointed out in the claims, being first described with reference to the accompanying drawings, which represent my invention designed for the manufacture of minute-pinions.

Figure 1:
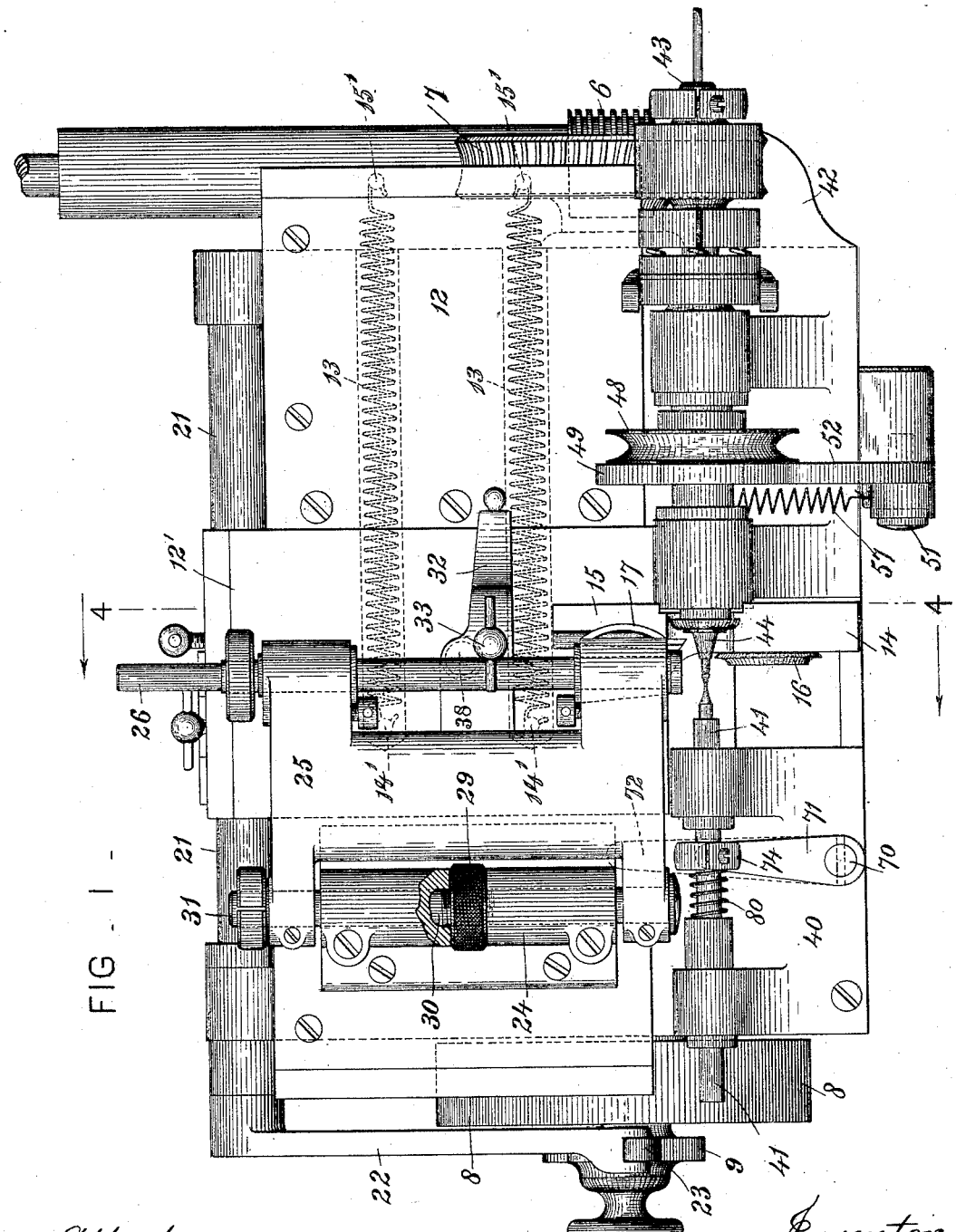
Figure 2:
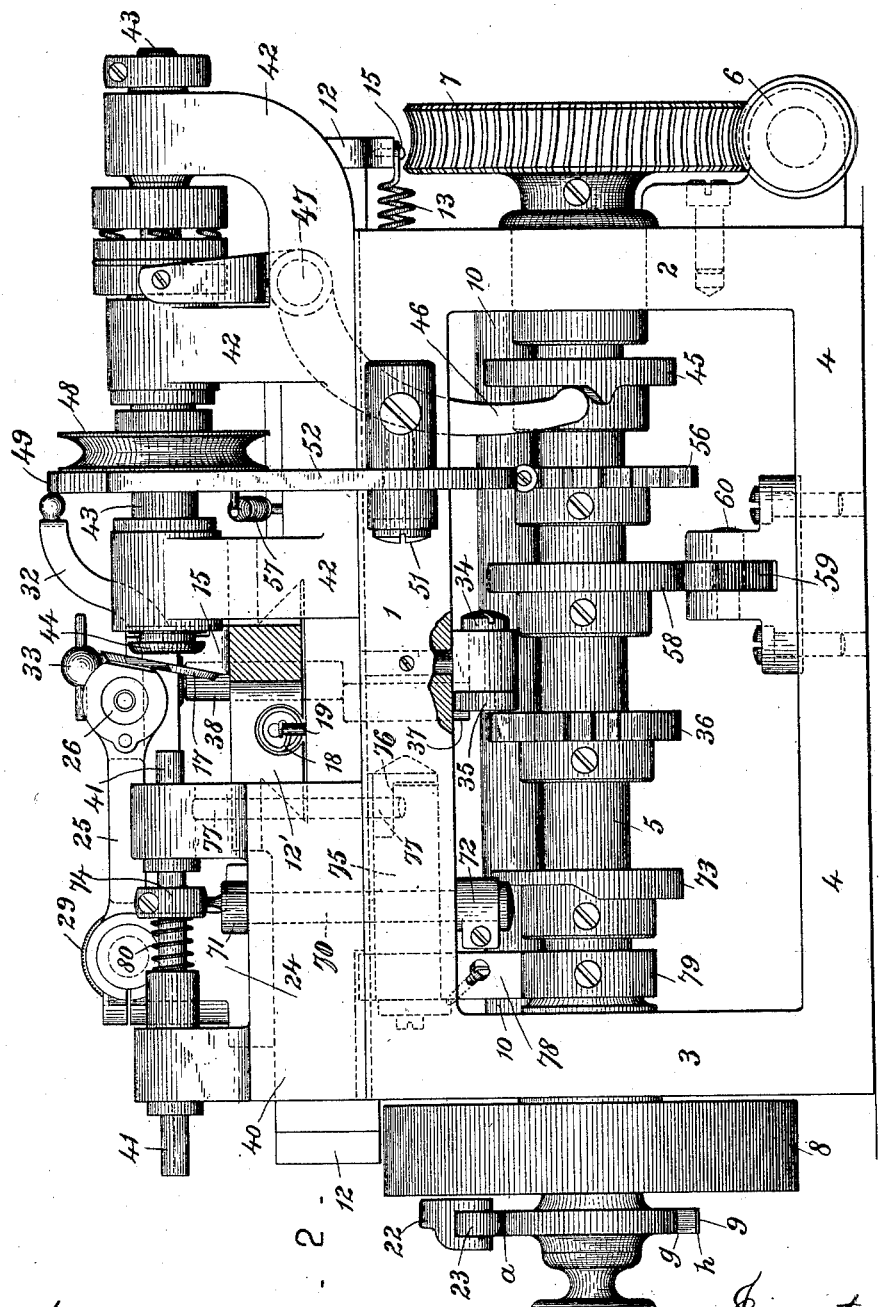
Figure 3:
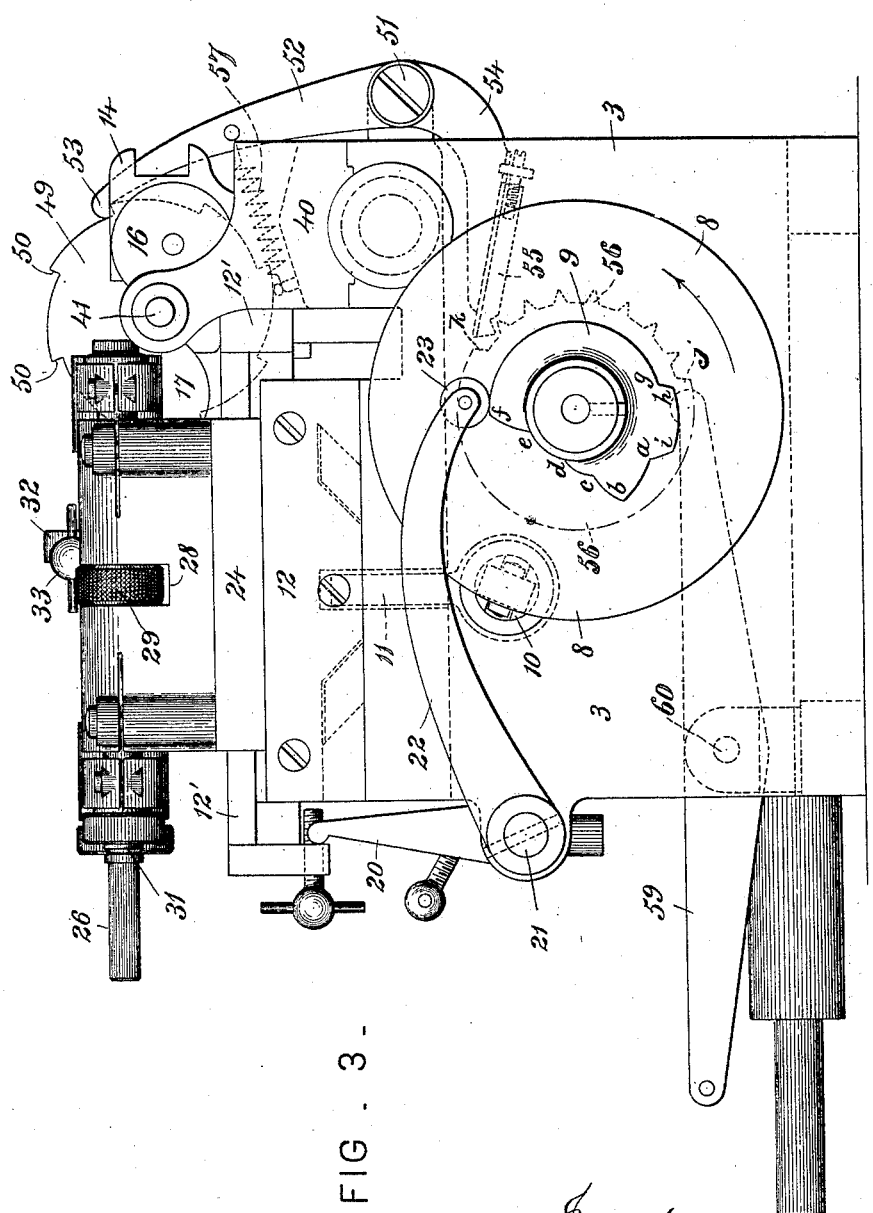
Figure 4:
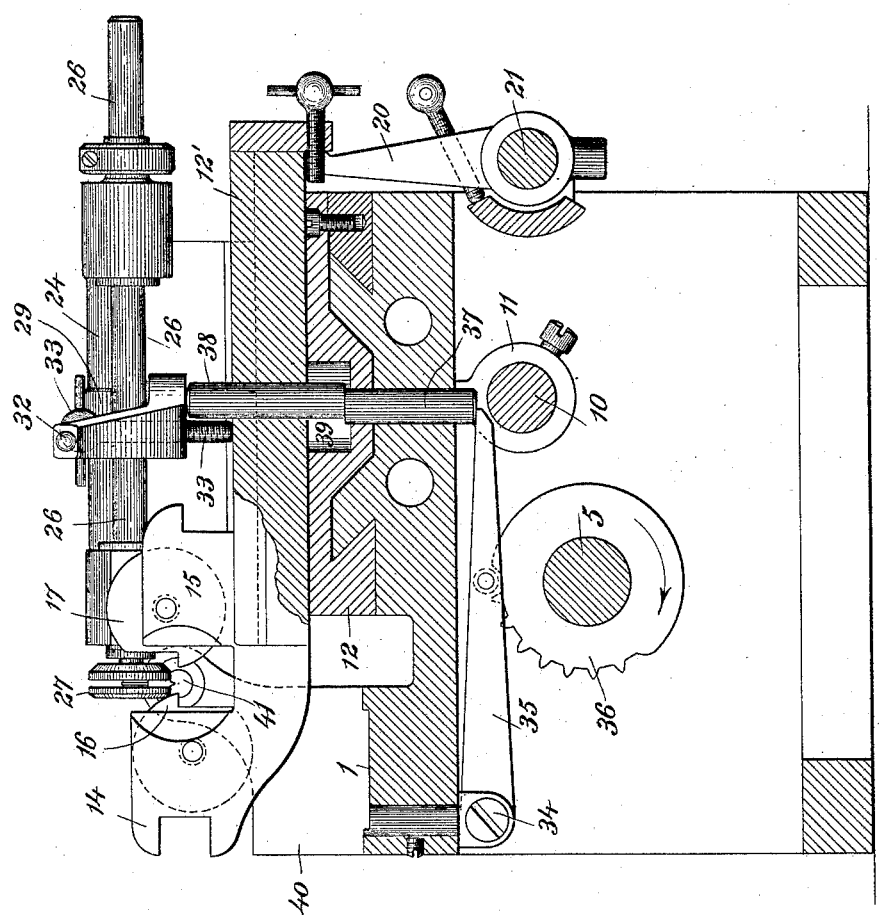

Figure 1 is a plan view of the machine. Fig. 2 is a view in front elevation. Fig. 3 is an end elevation. Fig. 4 is a transverse section on line 4 4, Fig. 1. Fig. 5 is a detail plan of the transverse tool-carrying slide. Fig. 6 represents an elevation of the same. Fig. 7 represents in plan the hinged frame which supports and carries the tooth-cutting tool. Fig. 8 represents an end view of the same. Fig. 9 is a magnified view representing the effect of the first action of the cutting-off tool—viz., marking the wire. Fig. 10 is a magnified view representing the effect of the tool for cutting the shoulder. Fig. 11 is a magnified view representing the effect of the tooth-cutting tool. Fig. 12 is a magnified view representing the effect of the second action of the cutting-off tool—viz., disconnecting the completed pinion. Fig. 13 is a magnified view of the completed minute-pinion.

The frame of the machine consists of a bed 1, legs 2 3, and a base 4. Mounted in the frame beneath the bed 1 and supported by the legs 2 3 is a main shaft 5, deriving motion from worm 6 and gear 7 at the right of the machine. At the extreme left of the machine the main shaft supports and carries the cams 8 9, which respectively operate the longitudinal and transverse slides for advancing and withdrawing the tools to and from their work, as hereinafter described. Beneath the bed 1, to the rear and running parallel with the main shaft 5, is a shaft 10, provided with an arm 11, Figs. 3 and 4. Sliding in ways on the bed 1 is a longitudinally-reciprocating slide 12. The slide 12 derives motion from right to left through springs 13, connected at 14' to the bed and at 15' to the slide 12. The slide 12 derives motion from left to right through arm 11, carried by shaft 10, which is acted on by cam 8. It will thus be seen that as cam 8 alternately releases and acts upon the shaft 10 the slide 12 will be reciprocated longitudinally. Mounted in ways on slide 12 is a transversely-reciprocating slide 12', provided with vertically-projecting portions 14 15 for receiving and carrying the marking and cutting-off tool 16 and the shoulder-forming tool 17 respectively. (See Fig. 4.) The slide 12' derives motion forward from a spring 18, Fig. 2, attached at one end to the slide 12' and at the other end to the slide 12 at 19. (See Fig. 2.) The slide 12' derives backward motion from an arm 20, Fig. 3, carried by a shaft 21, which is provided at one end with an arm 22, carrying a roller 23, operated upon by cam 9. It will thus be seen that as cam 9 alternately acts upon and releases the arm 22 the slide 12' will be reciprocated transversely.

Suitably placed upon the slide 12 is a standard 24, Figs. 1 and 3, provided with a rod 31 for supporting a frame 25, which carries a spindle 26, that is provided with the tooth-cutting tool 27. (See Fig. 4.) The standard 24 is formed with a slot 28, Figs. 1 and 3, to accommodate a milled disk 29, internally threaded to correspond to the thread 30 on the rod 31. This construction is for the purpose of giving an accurate horizontal adjustment to the tool 27, and it will be seen that by turning the disk 29 the frame 25 can be moved forward or backward, as desired. Attached to frame 25 is a curved arm 32, Figs. 1, 2, and 8, which serves for a handle when it is desired to swing the frame by hand out of operation. Arm 32 also serves for carrying adjusting-screw 33, Figs. 1 and 4, which is for the purpose of giving an accurate vertical adjustment to the tool 27.

Located beneath the bed 1, having its fulcrum at 34, is a lever 35, Fig. 4, operated by a cam 36 on the main shaft 5. The rear end of this lever when lifted by cam 36 acts upon a pin 37, located in the bed 1, and lifts the frame 25 through the medium of a pin 38, carried by the transverse slide 12' and bearing on the arm 32, which lifting action raises the tooth-cutting tool 27 out of action, for the purpose hereinafter described. The slide 12 has a slot at 39, Fig. 4, to allow for the transverse movement of the slide 12', and the meeting ends of the pins 37 38 slide upon each other during the independent movement of said slide 12'.

Mounted on the bed 1 to the left is a standard 40, Figs. 1 and 2, for supporting a tail-stock spindle 41, against which the wire to be operated upon is gaged to position, said tail-stock spindle being operated by any suitable mechanism to determine the forward movement or projection of the rod which supplies the material for the pinions when the chuck is opened to permit such forward movement, said mechanism as here shown being as follows: Extending vertically through the bed 1 and base of standard 40 is a shaft 70, provided at top and bottom, respectively, with arms 71 72. Mounted on shaft 5 is a cam 73, which acts on arm 72 and adjusts the tail-stock spindle through the medium of shaft 70 and arm 71, the latter having connection with the spindle through its collar 74. (See Fig. 2.) Mounted in the bed 1 is a shaft 75, having a cam-shaped end 76 to act upon a vertical rod 77, which impinges against spindle 41 and locks it to place. At the opposite end of shaft 75 is an arm 78, which is acted on by cam 79 on main shaft 5. The spring 80 on the spinle 41 acts in opposition to cam 73 on the main shaft 5.

Mounted on the bed 1 to the right is a standard 42, Fig. 2, provided with a hollow spindle 43 of ordinary construction, having a chuck 44, operated by cam 45 on shaft 5 through lever 46, having its fulcrum at 47 in the standard 42. To the driving-pulley 48 of spindle 43 is secured a disk 49, Fig. 3, having teeth 50, which correspond in number to the number of teeth it is desired to cut on the pinion, having its fulcrum at 51. On the bed 1 is a lever 52, Fig. 3, the upper end 53 of which is formed with a hook for engaging the teeth 50 on disk 49. The lower portion 54 of lever 52 is provided with an adjustable piece 55, Fig. 3, which is operated upon by cam 56 on shaft 5 to disconnect the hook 53 and teeth 50. When cam 56 releases lever 52, the spring 57 draws the hook 53 into engagement with one of the teeth 50, (see Fig. 3,) and spindle 43 is held from rotating to allow the tool 27 to cut a tooth, and lever 52 is alternately released and acted upon by cam 56 until all the teeth are formed. During the time that the lower portion 54 of lever 52 is in contact with that portion of cam 56 between points $j$ and $k$ the locking-hook 53 is held out of engagement with teeth 50 on disk 49 and the spindle 43 is free to rotate. Spindle 43 is driven by a belt, preferably round, running on pulley 48, affixed to the spindle, said belt being driven by a counter-shaft, (not shown,) which by suitable mechanism is driven at different speeds, its rotation being rapid when the spindle is rotated continuously and the work is being turned or reduced and comparatively slow during the period when the disk 49 is alternately held and released by the hook 53, this slow movement being for the purpose of giving time for the hook to be raised to release a tooth 50 and dropped in time to catch the succeeding tooth. The counter-shaft is changed from fast to slow speed at the proper time by the action of cam 58 on lever 59, Fig. 2, and connected with counter-shaft by any suitable means. When the disk 49 is arrested by the hook 53, the belt slips on the pulley 48.

In Fig. 1 of the drawings tool 27 has been omitted for the purpose of better illustrating parts below. In Fig. 2 this tool is also omitted, and the forward part of slide 12' is omitted, a section being taken on line 2 2 of Figs. 5 and 6.

The operation of the machine is as follows: The machine being set in motion, cam 73 on main shaft 5 acts on arm 72 and adjusts tail-stock spindle 41 through the parts 70, 71, and 74. Immediately upon the spindle 41 reaching the proper position cam 79 acts upon arm 78 of shaft 75, causing its cam end 76 to lift rod 77 and lock spindle 41 to place. The machine is now in position for the commencement of its work. Cam 45 acts upon lever 46 and opens clutch 44 to permit the wire to be fed in. These operations take place while roller 23 is traveling from $i$ to $a$ on cam 9 (see Fig. 3) and tool 16 is being moved out of action, it having just cut off a completed pinion. Roller 23 now travels from $a$ to $b$ and tool 16 is moved inward and marks the wire, as shown in Fig. 9, by cutting the groove 90 therein. Roller 23 now travels from $b$ to $c$ and tool 16 is again withdrawn from action. While roller 23 is traveling from $b$ to $c$ cam 8 releases shaft 10 and springs 13 move slide 12 to the left to bring tool 17 to position. Roller 23 then travels from $c$ to $d$ and tool 17 is advanced to a distance corresponding to the depth of cut required to form the shoulder 92, Fig. 10. While roller 23 is traveling from $d$ to $e$ cam 8 acts upon shaft 10, moves slide 12 to the right, and tool 17 cuts the shoulder 92 of a length corresponding with the length of movement of the slide 12. (See Fig. 10.) Roller 23 now travels from $e$ to $f$ and tool 17 is withdrawn from action. While tool 17 is being withdrawn cam 8 again releases shaft 10 and springs 13 move slide 12 to the left. The machine is now in position to commence the operation of cutting the teeth, and this is done while roller 23 is traveling from $f$ to $g$, during which time the three cams 8, 36, and 56 are brought into action to operate the three cutting-tools 16, 17, and 27. When roller 23 reaches point $f$, cam 56 releases lever 52, spring 57 draws hook 53 into engagement with a tooth 50 on disk 49, and spindle 43 is held from rotating. Simultaneously with the action of cam 56 cam 36 releases lever 35, thus removing the support 37 38 of frame 25, which consequently drops until set-screw 33 comes in contact with slide 12'. This action brings the tool 27 into proper relation for cutting the teeth. Cam 8 now acts on shaft 10 and moves slide 12 to the right and the first cut is made for forming the teeth on the pinion. Instantly upon the slide 12 reaching the limit of its movement to the right cams 36 and 56 act simultaneously upon levers 35 and 52. Cam 36 elevates frame 25 and tool 27 is lifted above the groove it has formed. Cam 56 disengages hook 53 and allows disk 49 to revolve one notch, or one-eighth of an entire revolution, as the spring 37 instantly draws the end 55 into the second groove of cam 56, causing hook 53 to again arrest the revolution of spindle 43. While the cams 36 56 are operating upon their respective levers 35 52 cam 8 releases shaft 10 and slide 12 is moved to the left for bringing the tool 27 to position for making the second cut. As cam 36 again releases lever 35 and allows tool 27 to lower to operative position cam 8 again acts upon shaft 10, moves slide 12 to the right, and the second cut is made for forming the teeth on the pinion, thus making a complete tooth. The above operations are repeated eight times while roller 23 is traveling from $f$ to $g$, and at each operation disk 49 escapes the distance of one tooth 50, or forty-five degrees. These eight operations make a complete revolution of the spindle 43. Thus eight teeth are formed and the pinion is as represented in Fig. 11. The path from $f$ to $g$ on cam 9 being concentric with shaft 5, the slide 12' receives only the motion of slide 12 and is substantially a part of slide 12. When roller 23 reaches the point $g$ on cam 9, cams 36 56 simultaneously act on levers 35 52 for the last time, as the pinion is complete. Cam 36 elevates the frame 25 and tool 27 is held out of operation. Cam 56 disconnects hook 53 from tooth 50 and spindle 49 is free to rotate. Roller 23 now travels from $g$ to $h$, the cutting-off tool 16 is brought to position, and as roller 23 is traveling from $h$ to $i$ the tool 16 is moved slowly inward and the pinion is cut off, which leaves the wire as indicated in Fig. 12. At this point the operation is complete and main shaft 5 has made a complete revolution. Cam 58 now operates on lever 59, shifts the belting, and the machine is stopped.

I do not confine myself to the exact construction shown and described for making minute-pinions for watches, as it is evident that the transversely-moving slide could be dispensed with in cutting the teeth upon the peripheries of disks. In the case described the transverse slide is necessary for forming the shoulder and cutting off the completed gear manufactured from a wire; but in the case where disks are inserted the slide 12' is dispensed with and the cutting-tool 27 and operating parts are employed for cutting the teeth. It will be understood that by adjusting the screw 33 the tool 27 is brought to position for cutting a large or small gear, as desired, it being only necessary to have disk 49 and cams 8 36 56 conform to the desired number of teeth to be cut. It is also evident that disk 49 and cams 8 36 56 can be made changeable, thus making one machine capable of manufacturing different sizes of gears. The tool-carrying frame 25 is provided with means for adjustment in a direction at right angles with the axis of the work-holding chuck, said means being in this case the nut 29 and screw-threaded rod or shaft 30. This adjustment, which I term the "horizontal" adjustment, enables the tooth-cutting tool 27 to be accurately adjusted laterally with relation to the axis of the work. Said frame is given another adjustment by means of the screw 33 toward and from the axis of the work to regulate the depth of cut, this being termed by me a "vertical" adjustment. These two adjustments are very important in a machine of this kind. I believe it to be new with me to combine with a work-holding chuck a tool-carrying frame adapted to be reciprocated lengthwise of the work and provided with means for vertical and horizontal adjustment. Hence I do not limit myself either to the means here shown for effecting said adjustments nor to the means here shown for giving said frame its operative movements, as said means may be variously modified without departing from the spirit of my invention.

The slide, with its tool-carrying frame 25, having the described adjustment and means for reciprocating it lengthwise of the work and for alternately raising and depressing it, may be used in combination with a work-holding device and suitable means for moving the latter step by step and locking it in its different positions as a gear-cutting machine.

An important feature of my improved machine is the provision of means for alternating rotating the spindle continuously and step by step, the spindle having two alternating periods of rotation. The period of continuous rotation is when the hook 53 is held continuously away from the toothed disk 49 by the continuous portion of the disk 56, and the period of step-by-step rotation is when said hook is vibrated or thrown in and out by the teeth of the disk 56. This provision for alternating a continuous with a step-by-step rotation permits the whole operation of turning the blank and cutting the teeth therein to be performed during a single cycle of movement of the machine, or during one rotation of the shaft 5. The toothed disk 49, affixed to the spindle, and the hook 53, alternately held away from said disk for a considerable period and then vibrated or moved in and out during another period, may be termed an "index mechanism" which is alternately operative and inoperative, it being operative when it is oscillated or moved alternately in and out and inoperative when held continuously in its outer position.

I claim—

1. In a gear and pinion making machine, the combination of a work holding and rotating spindle, means for rotating the same, an alternately operative and inoperative index mechanism adapted when operative to alternately arrest and release said spindle, thus giving the latter a period of step-by-step rotation which is alternated with a period of continuous rotation, means for varying the rate of rotation of the spindle, so that its motion is more rapid during the continuous than during the step-by-step period, and suitable means for cutting a blank or piece of work held by said spindle, as set forth.

2. In a gear and pinion making machine, the combination of a work holding and rotating spindle, means for rotating the same, an alternately operative and inoperative index mechanism adapted when operative to alternately arrest and release said spindle, thus giving the latter a period of step-by-step rotation which is alternated with a period of continuous rotation, and a plurality of cutters and operating mechanism therefor, one of said cutters being adapted to reduce a blank held by the spindle during the continuous rotation, while another is adapted to form teeth on the blank during its period of step-by-step rotation, as set forth.

3. In a gear and pinion making machine, the combination of a work holding and rotating spindle, mechanism for alternately rotating the same continuously and step by step, a slide adapted to move longitudinally and transversely with relation to the spindle, two tools carried by said slide at opposite sides of the axial line of the spindle, means for moving said slide transversely to present said tools alternately to the work, means for moving said slide longitudinally while one of the tools is presented to the work, a vertically-movable frame on said slide having a tooth-forming tool adapted to be moved along the work by the longitudinal movements of the slide, and means for alternately raising and depressing said frame to make said tool alternately operative and inoperative, as set forth.

4. In a gear and pinion making machine, the combination of a work holding and rotating spindle, mechanism for alternately rotating the same continuously and step by step, a slide adapted to move longitudinally and transversely with relation to the spindle, two tools carried by said slide at opposite sides of the axis of the work held by the spindle, mechanism for moving said slide transversely to present said tools alternately to the work, mechanism for moving the slide longitudinally while one of the tools is presented to the work, a vertically-movable frame on said slide having a tooth-forming tool adapted to be moved parallel with the axis of the work by the longitudinal movements of the slide, mechanism for alternately raising and depressing said frame to alternately present said tool to and remove it from the work, and mechanism for rotating the spindle step by step and for locking it after each step or partial rotation, the several operating mechanisms being organized to operate in the order specified, whereby a blank is first scored or grooved circumferentially, then reduced in diameter at one end, and finally provided with teeth, as set forth.

5. In a gear and pinion making machine, the combination, with a work holding and rotating spindle and mechanism for alternately rotating the same continuously and step by step, of a slide movable longitudinally with relation to said spindle and a frame carrying a tooth-forming cutter connected with said slide and capable of horizontal and vertical adjustment thereon, as set forth.

6. In a gear and pinion making machine, the combination, with a work holding and rotating spindle and mechanism for alternately rotating the same continuously and step by step, of a frame carrying a tooth-forming cutter and provided with means for horizontal and vertical adjustment with relation to the chuck, whereby the cutter may be brought into proper operative position, and means for reciprocating said cutter in directions parallel with the axis of the chuck, as set forth.

In testimony whereof I have signed my name to this specification, in the presence of two subscribing witnesses, this 31st day of October, A. D. 1891.

DUANE H. CHURCH.

Witnesses:
E. A. MARSH,
A. D. HARRISON.